United States Patent [19]

Gustafsson

[11] 3,981,510

[45] Sept. 21, 1976

[54] TRANSPORT CARRIAGE

[75] Inventor: Nils Henry Gustafsson, Alvsjo, Sweden

[73] Assignee: Swepall AB, Stockholm, Sweden

[22] Filed: June 3, 1975

[21] Appl. No.: 583,411

[52] U.S. Cl. .......................... 280/33.99 H; 280/79.3
[51] Int. Cl.² ...................... B62B 3/02; B62B 11/00
[58] Field of Search ............. 280/33.99 H, 33.99 R, 280/33.99 F, 36 R, 79.3; 186/1 AC

[56] References Cited
UNITED STATES PATENTS

| | | | |
|---|---|---|---|
| 3,191,959 | 6/1965 | Heimbruch et al. | 280/33.99 R |
| 3,810,648 | 5/1974 | Hallenius | 280/33.99 R |
| 3,840,242 | 10/1974 | Craig, Sr. et al. | 280/36 R |
| 3,840,243 | 10/1974 | Rheinhart | 280/36 R |
| 3,874,689 | 4/1975 | Morgan | 280/79.3 |

FOREIGN PATENTS OR APPLICATIONS

| | | | |
|---|---|---|---|
| 1,169,317 | 5/1969 | United Kingdom | 280/33.99 R |

Primary Examiner—M. H. Wood, Jr.
Assistant Examiner—David M. Mitchell
Attorney, Agent, or Firm—Murray Schaffer

[57] ABSTRACT

A transport carriage having a frame comprising a rear wall and side walls connected to said rear wall with running wheels and means enabling several transport carriages of this type to be stored in each other in a space-saving way. The frame is pivotally mounted on a rear carrying member or supporting means. At least one of the side walls of the frame is pivotally connected to the rear wall whereas the remaining parts of said frame, i.e. the rear wall and second side wall are fixed forming a L-shaped structure, thus enabling the carriage to be brought into transport condition — in which the side walls are positioned parallel to each other — or into storing condition — in which the side walls are expanded outwardly.

14 Claims, 12 Drawing Figures

TRANSPORT CARRIAGE

BACKGROUND OF THE INVENTION

The present invention relates to a transport carriage comprising, in connection with a chassis designed as a frame and provided with at least three running wheels, means for space-saving storing of several transport carriages within each other.

Transport carriages of this type, when not in use, are inserted into each other in order to save space. This problem of storing several transport carriages within each other has already been solved in various ways, it being a disadvantage of all of these known constructions that the transport carriages cannot readily be brought by simple measures from its storing position into its position of use, i.e. the transport position. In order to enable such transport carriages to be nested within each other the side walls which in the transport position extend substantially parallel to each other must be swung outwardly. Accordingly, it is necessary to provide in such carriages a construction which guarantees a sufficient stability of the carriage during storing and during adaptation to the transport position. One object of the present invention is therefore to eliminate the above mentioned drawbacks and to provide a carriage having sufficient stability in its various positions.

A further object of the invention is to provide a carriage with a new and improved construction giving optimal simplicity during the necessary converting steps when said construction is to be brought from its storing condition to its transporting condition.

These objects and others, numerous advantages will be set forth and will be apparent from the following description of the invention.

SUMMARY OF THE INVENTION

According to the invention the carriage is provided with a rear support means having at least one running wheel, and a frame comprising a rear wall having connected thereto side walls and being pivotally journalled on the carrying member. At least one of the side walls is pivotally connected to the rear wall so as to swing with respect to it and each is provided with a running wheel at its forward end.

In accordance with one embodiment of the invention, one side wall of the frame is fixedly connected to the rear wall approximately at right angles so as to form an L-shaped structure, In this case the L-shaped frame portion comprising the rear wall and side wall can be integral and the rear wall can be pivotally journalled approximately centrally of the supporting means.

In accordance with a further embodiment of the invention the second side wall is pivotally connected to the rear wall of the L-shaped frame portion. It is thus possible to provide a portion of this side wall, integrally fixed to the L-shaped frame, this portion of the second side wall being disposed approximately at right angles to the rear wall i.e. in parallel to the opposite side wall. The remaining part of this side wall is pivotally connected to the fixed portion extending from the rear wall.

In order to permit limited outward swinging of the side wall pivotally connected to the rear wall a lever is provided, one end of which is pivotally connected to the swingable side wall and the other end of which is pivotally connected to the carrying member.

A limitation of the outward swinging of the side walls can also be obtained by providing the supporting means with a pair of spaced abutments.

In addition, the transport carriage according to the invention is provided with a number of shelves which are hingedly supported on the rear wall or one of the side walls. In this case these shelves are suitably provided with means for releasable engagement with the side walls or the rear wall respectively.

Full details of the present invention follow herein and will be seen in connection with the accompanying drawings, where FIG. 1 is a perspective view of a carriage or trolley according to the invention in its expanded position, i.e. in its position ready for nesting or storing of several carriages;

FIG. 8 shows three mutually nested transport carriage constructed according to

Figure 7:
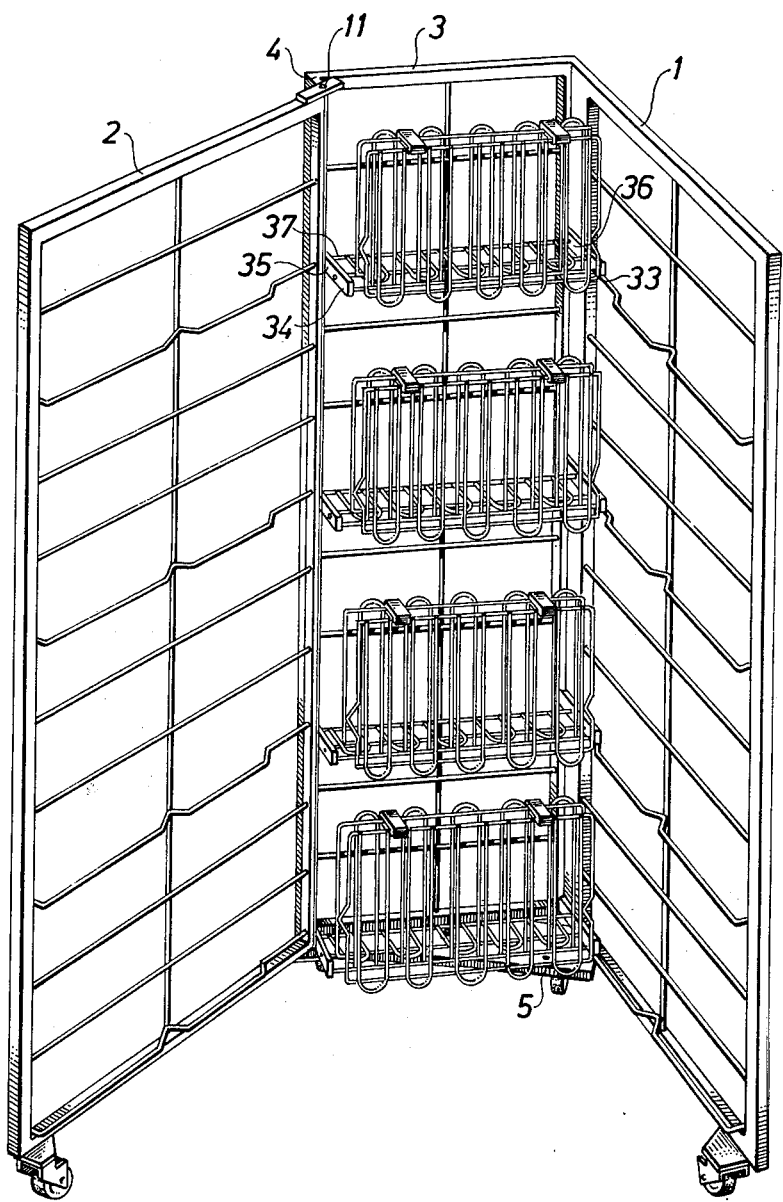
FIG. 7 is a perspective view of another embodiment of a carriage according to the invention in its expanded position.
Figure 8:
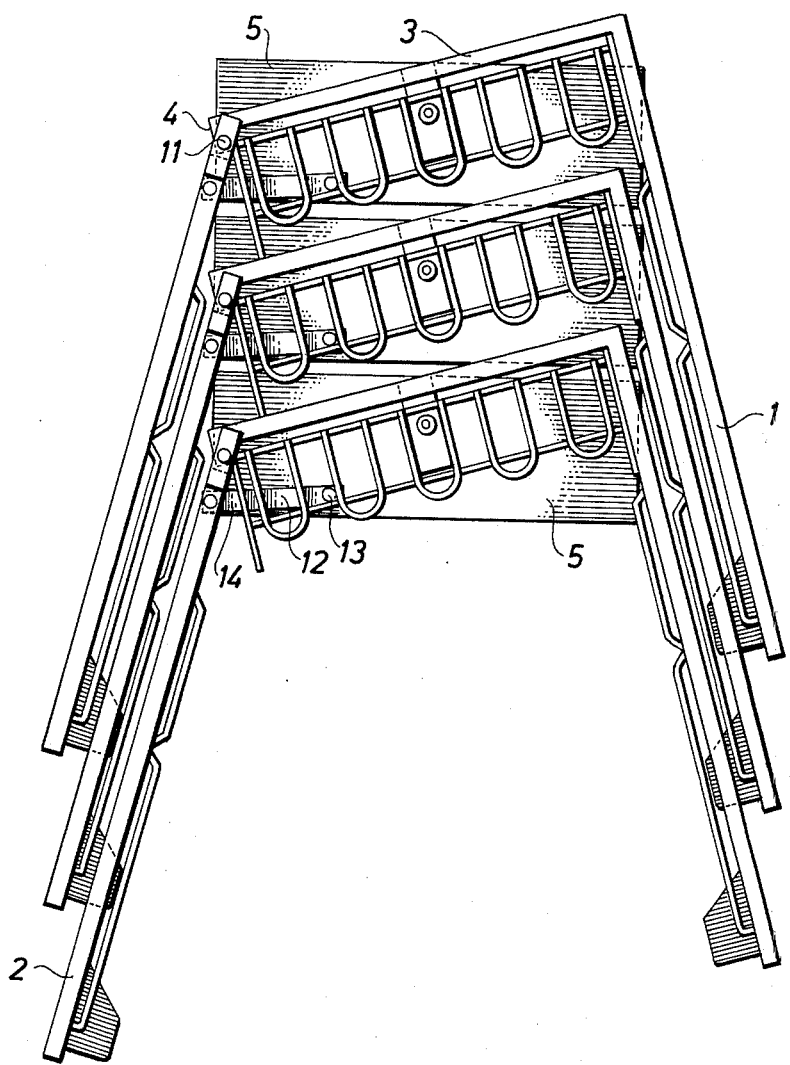
Figure 9:
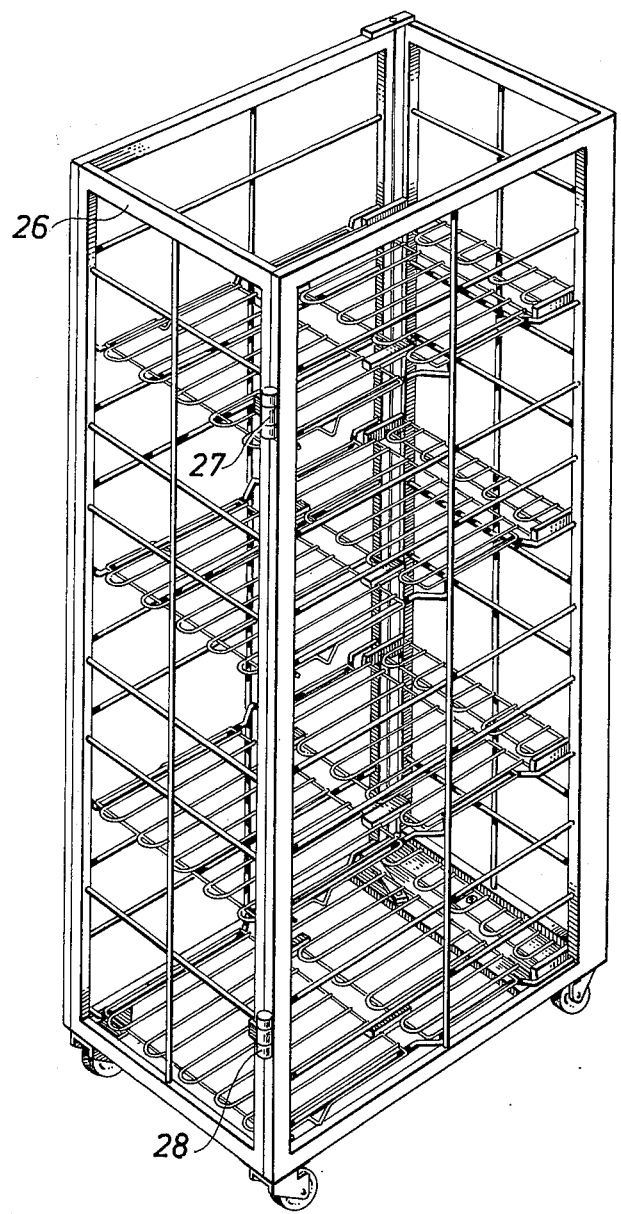
Figure 10:
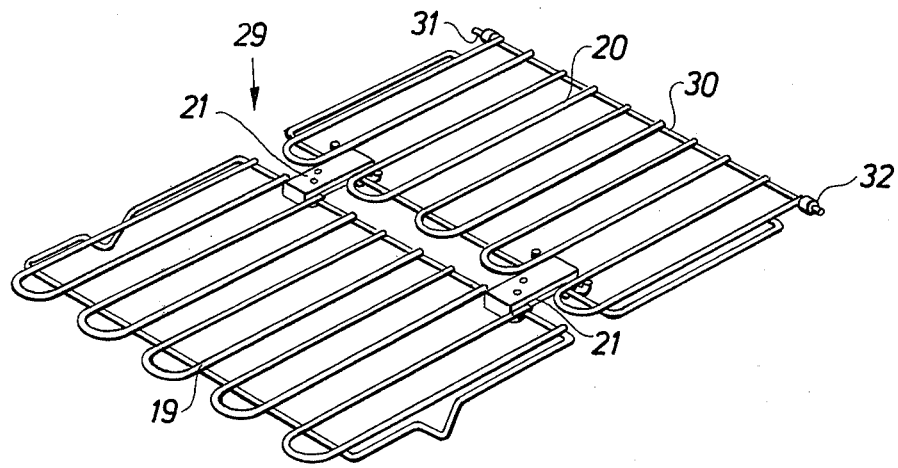
Figure 11:
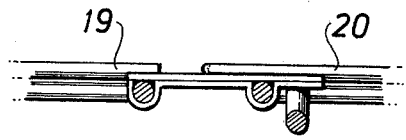
Figure 12:
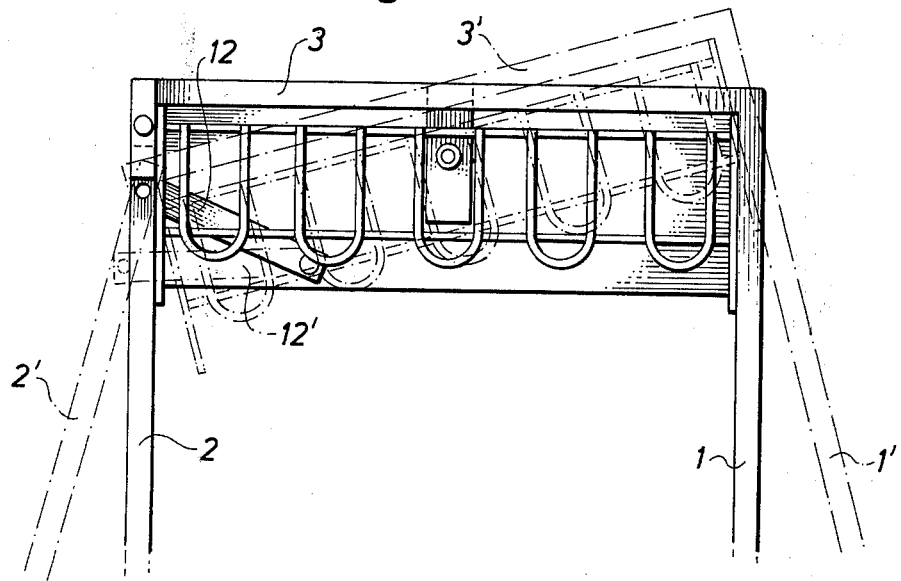

FIG. 7 and seen from above;

FIG. 9 is a perspective view of the carriage shown in FIG. 7 in its condition of use, this carriage additionally being provided with a forward wall;

FIG. 10 is a perspective view of a shelf used in a carriage as shown in FIG. 7;

FIG. 11 is an enlarged view of the shelf shown in FIG. 10 as far as the connecting pieces are concerned; and FIG. 12 shows an arresting device enabling the carriage according to FIG. 7 to be controllably expanded.

In the embodiment shown in FIGS. 1 – 5 the transport carriage comprises two vertical side walls 1, and 2 and a vertical rear wall 3 provided between these side walls. The one side wall 2 is swingably hinged with respect to the rear wall 3. In this embodiment the one side wall 1, the rear wall 3 and a portion 4 of the other side wall 2 are integrally formed to extend from the rear wall. The rear wall 3 pivotally mounted on horizontal supporting means 5, being journalled about a vertical pin 6.

Figure 5:
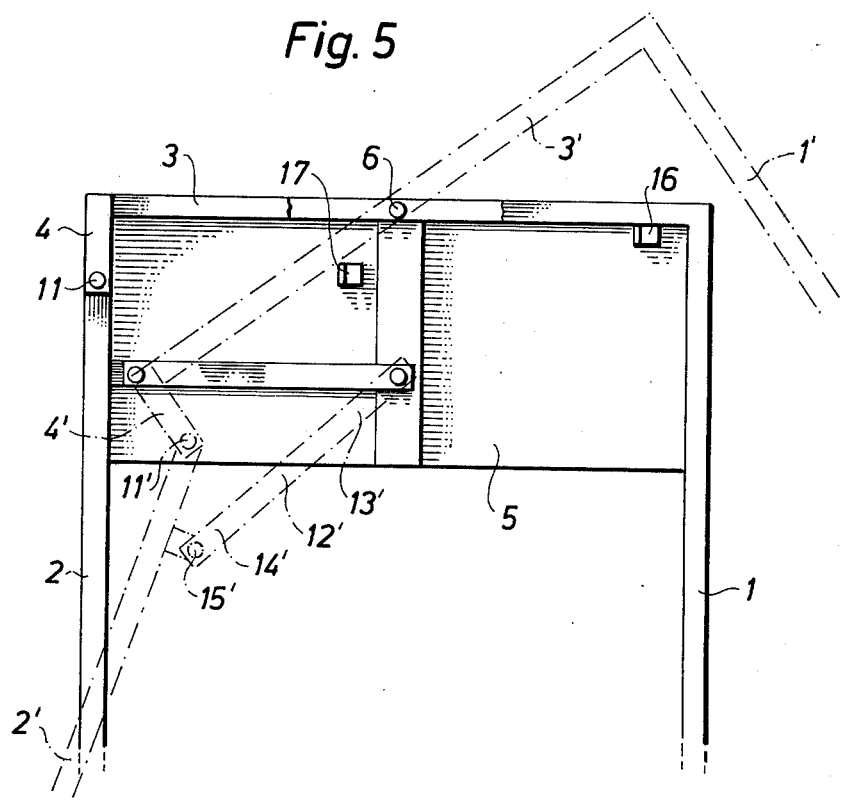
FIG. 5 shows an arresting device enabling the carriage according to FIG. 1 to be controllably locked in respectively its condition of use and its condition of storage.

During use of the transport carriage the frame assumes a position corresponding to the position shown in full lines in FIG. 5, the rear wall 3 thus forming an angle of about 90° with the side walls, 1, 2 and contacting an abutment 16 or the upper surface of the support means 5. At the same time, a lever arm 12 pivotally connected to the swingable sidewall 2 and the support means 5 extends substantially in parallel to rear wall 3.

Figure 6:
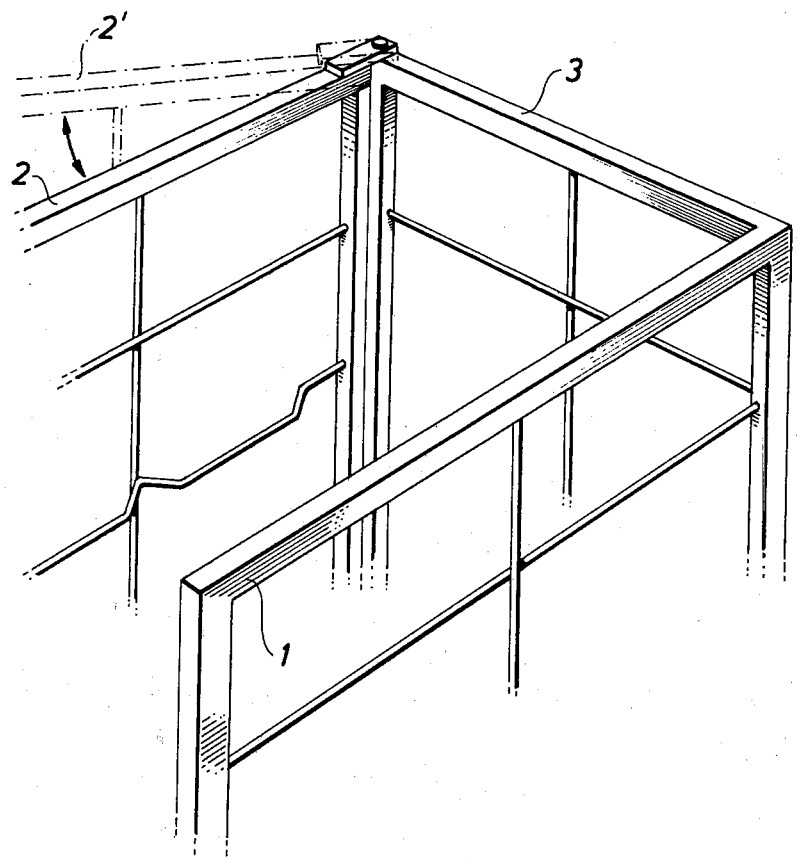
FIG. 6 is a perspective partial view of another embodiment of the transport carriage proposed by the invention.

When the transport carriage is not in use the frame is swung to the position shown by dot-and-dash lines, for example by outward swinging of side wall 2. Hereby, rear wall 3 is forced to turn about pin 6 until rear wall 3 comes into contact with a second abutment 17 on the support means 5. Of course, shelves 18 when provided have been folded up prior to this swinging adjustment towards rear wall 3 (compare in this connection FIG. 1). The position of the various parts in the condition of the carriage shown by dot-and-dash lines in FIG. 5 are designated by references 1', 2', 3', 4' etc. In the alternative embodiment of the invention shown in FIG. 6 side wall 2 is in direct pivotal connection with rear wall 3. Thus, the frame here comprises a L-shaped part formed by rear wall 3 and the side wall 1 and the other side wall 2 which is immediately hingedly connected to the opposite end of the rear wall. Also in this embodiment the outward swinging of side wall 2 can be limited by devices known in themselves.

A further embodiment is shown in FIGS. 7 – 12. The basic difference between this embodiment and the embodiment according to FIGS. 1 – 5 consists, on the one hand, in that the arresting mechanism is different and, on the other hand, that the shelves are differently constructed. For the sake of simplicity the same reference designations as in FIGS. 1 – 5 have been used for those parts of the carriage according to FIGS. 7 – 12 which agree with the carriage according to FIGS. 1 – 5.

Thus, the carriage according to FIGS. 7 – 12 comprises an integral frame which is pivotally supported on a carrying member or support means 5 and which comprises a side wall 1, a rear wall 3 and the fixed part 4 of the swingable side wall 2. The remaining part of side wall 2 is pivotally supported on part 4 by suitable hinges so that the angle between the respective legs and the rear wall is substantially 90° in transport condition. The rear wall 3 is in its lower central portion adapted to pivot about the pin 6 extending from a plate-shaped carrying member or support means 5. The support means is supported by two mutually spaced running wheels 7,8. In addition, side wall 2 is pivotally attached to the partial side wall 4 extending from the rear wall 3 by means of a hinged connection 11. Each side wall 1 and 2 respectively is supported at its forward end by a running wheel 9, 10. For the purpose of limiting the outward swinging movement of side wall 2 about the articulated connection 11 a lever 12 is provided one end 13 of which is pivotally attached to carrying member 5 and the other end of which is pivotally connected to side wall 2 at a point 15 which is slightly spaced from the articulated connection 11. In addition, two abutments such as shown in FIG. 5 are provided on the carrying member 5 to limit also the swinging movement of side wall 2 by contact with rear wall 3.

Figure 4:
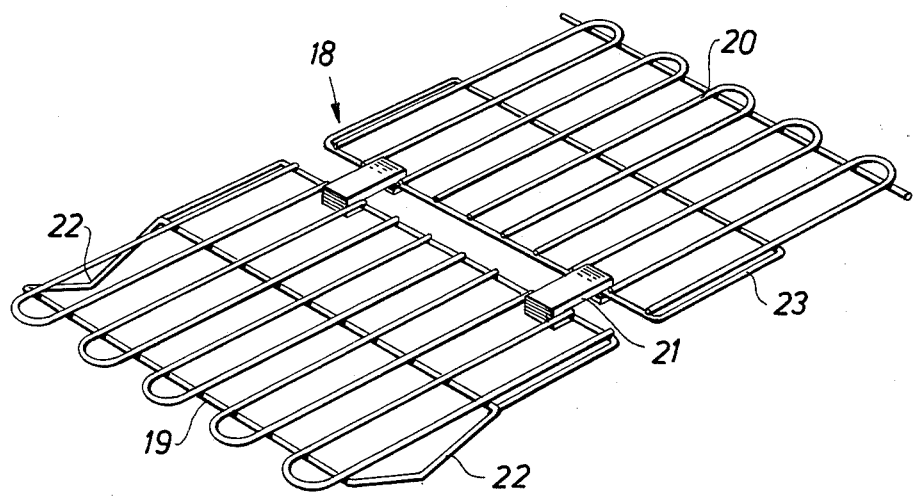
FIG. 4 is a perspective view of one shelf belonging to the carriage shown in FIGS. 1 — 3.

The shelves 18 may, for example, have the construction shown in FIG. 4 wherein they are formed in two parts 19, 20 which due to a connection comprising several clamps 21 form a foldable unit. To secure the shelves 18 in their unfolded position engaging extensions 22, 23 are provided at their longitudinal edges which cooperate with inwardly deflected parts 24, 25 formed on the respective side walls 1 and 2 (compare in this regard FIG. 3).

Obviously, the shelves 18 can be designed in various ways and may thus be subdivided into more than two sections, for example three sections. Moreover, the shelves may be so designed and arranged that they are folded up against one of the side walls when the carriages are mutually nested.

Thus, the transport carriage shown in FIGS. 7–12 basically comprises a frame pivotally supported by a carrying member 5 or support means and includes as an integral construction one side wall 1, the rear wall 3 as well as a part 4 of the other side wall 2. The remaining portion of the side wall 2 is hingedly supported by means of an articulated connection 11 with the partial side wall 4 to extend from the rear wall 3.

Also in this embodiment the rear wall is rotatably supported by the carrying member or support means 5. In order to limit the swinging movement of side wall 2 a lever 12 is provided, one end of which 13 is pivotally connected to the supporting means 5 and the other end of which 14 is pivotally connected to side wall 2. Thus, in this embodiment the one end 14 of lever 12 is directly connected to the side wall and, in addition, the lever is considerably shorter in comparison with the lever shown in the carriage according to FIGS. 1 – 5 so that its opposite end 13 is journalled on the supporting means in a point which is much closer to side wall 2. In the carriage according to FIGS. 1 - 5 the end 13 of lever 12 is attached approximately in the center of supporting means 5, i.e. in line with pivot point 6 of the rear wall 3. As appears in particular from FIG. 8, due to the shorter lever 12 less space is required for the outward swinging adjustment when the carriages are nested within each other.

In FIG. 9 this carriage is shown in its state of use, the carriage also being provided with a forward wall 26 which is pivotally attached to the fixed side wall 1 by means of hinges 27, 28.

Figure 1:
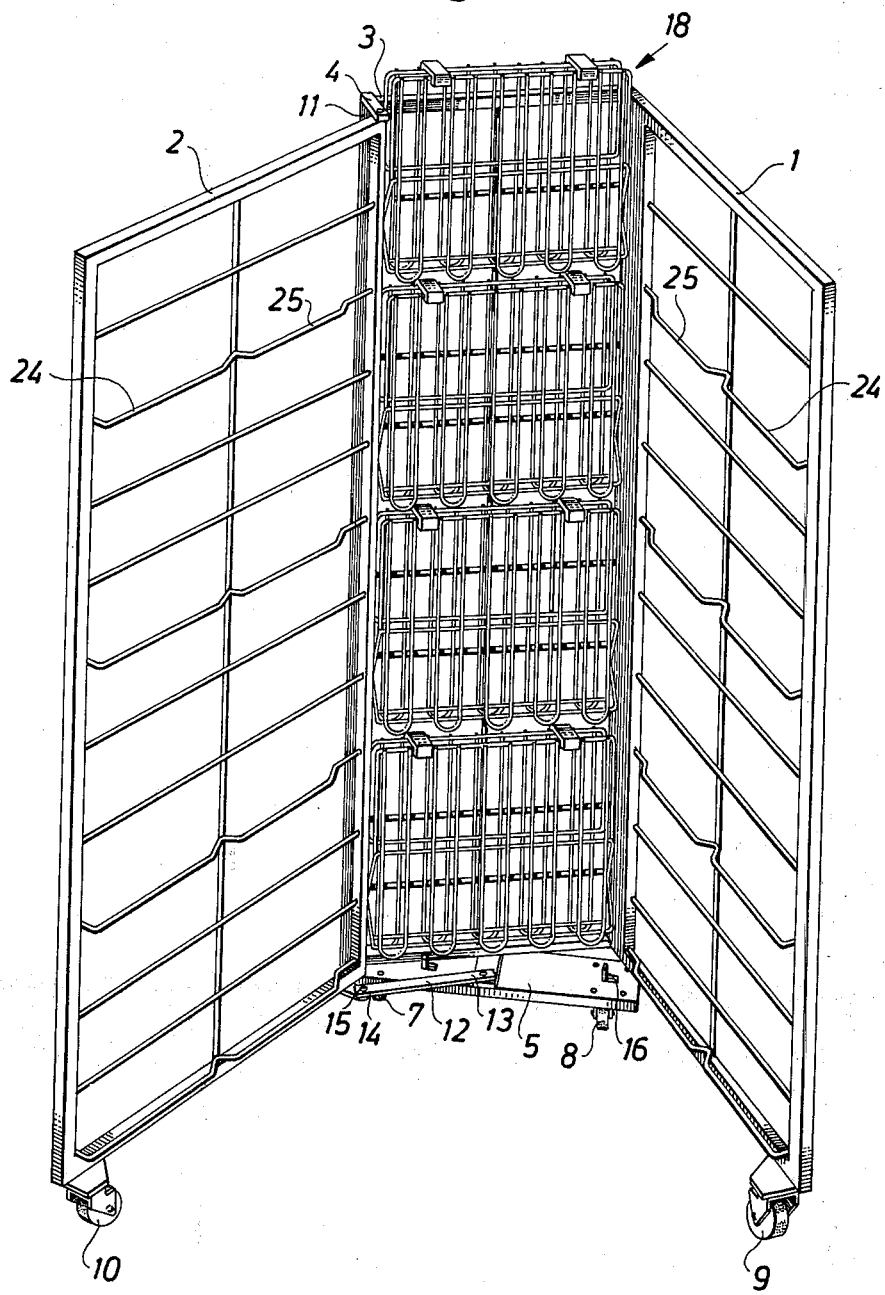
Figure 2:
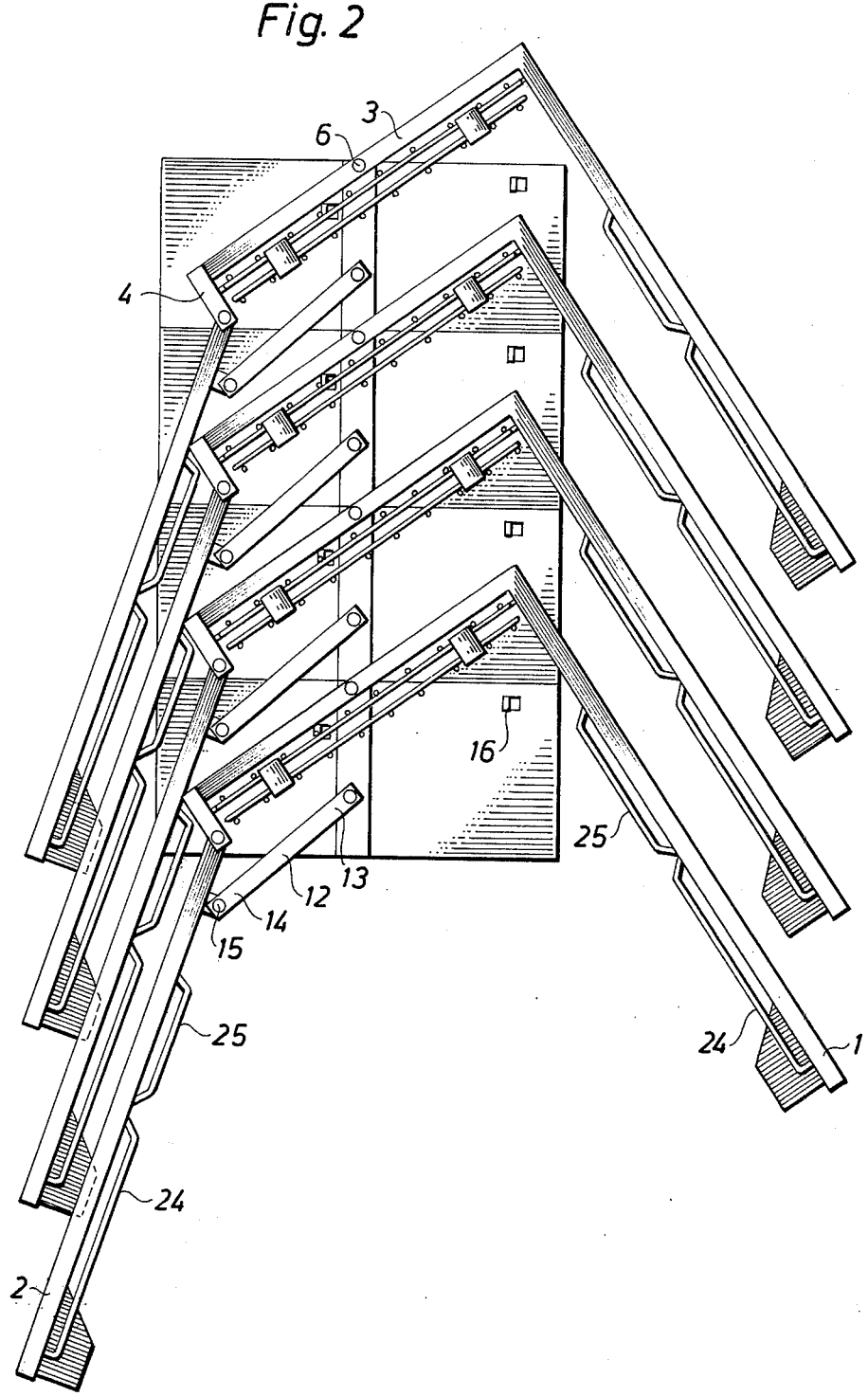
FIG. 2 is a plan view of four mutually nested carriages according to the invention.
Figure 3:
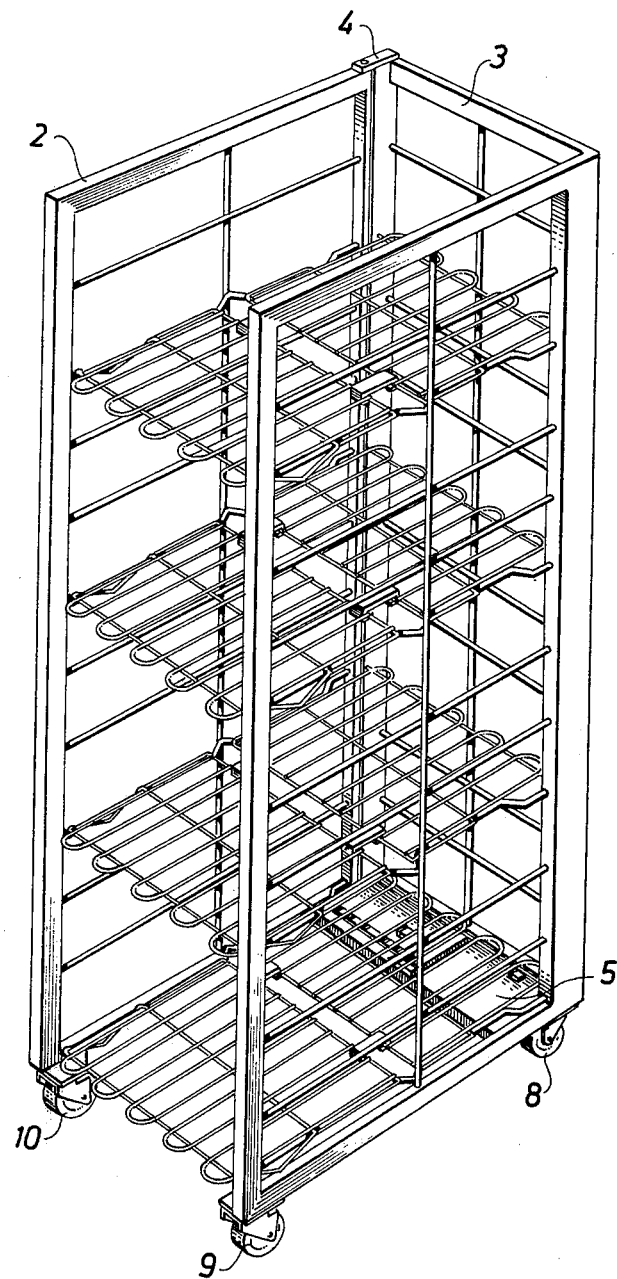
FIG. 3 is a perspective view of the carriage shown in FIG. 1 in its condition of use, i.e. with the shelves mounted.

The shelves of the carriage shown in FIGS. 7 – 12 deviate as to their construction slightly from the shelves used in the carriage according to FIGS. 1 – 5. A shelf 29 intended to be used in the carriage according to FIGS. 7 to 12 is shown separately in FIG. 10 and comprises a first shelf portion 20 connected to a second shelf portion 19 by two connecting members 21. The shelf portion 20 is provided with a transversely extending end part 30 having protruding tips 31, 32 adapted to be received in corresponding holes 33, 34 in shelf brackets 35, 36 extending from the rear wall 3. The shelf brackets 35, 36 also support between themselves a stationary shelf portion 37 having a construction enabling it to receive the folded shelf 29 as shown in FIG. 2. The particular construction of connecting members 21 and the attachment will appear from FIG. 11.

FIG. 12 illustrates the function of the limiting mechanism clearly showing the position of the respective parts in the state of use (folded position) and the nesting condition (swung-out position) respectively of the carriage. The transport position of the carriage is indicated by full lines and the swung-out position of the carriage by dot-and-dash lines.

The invention is not restricted to the embodiments illustrated in the drawings but may be varied in various ways within the limitations of the subsequent claims. Thus, for example, in place of the carrying member or supporting means 5 in the shape of a plate the wheel-housing structure of a rear running wheel may be used as a support of the rotatable attachment of the rear wall. Moreover, the side walls as well as the rear wall and the shelves may be constructed in many different ways.

What is claimed is:

1. Transport carriage comprising a horizontally extending supporting means having at least one running wheel, and a vertically extending frame, said frame comprising a rigid rear wall and a pair of rigid side walls, at least one side wall being pivotally connected to said rear wall, a bearing pin interconnecting said supporting means and the rear wall of said frame to permit said frame to pivot about a vertical axis with respect to said supporting means, and at least one running wheel provided at the forward portion of each of said side walls, said frame being pivotal about said bearing pin, and said pivotal side wall being movable with respect to said rear wall between a first position wherein said side walls are parallel to each other for transport condition and a second position wherein said side walls diverge outwardly into nesting condition with another similarly constituted transport carriage.

2. The transport carriage according to claim 1 wherein the other of said side walls is fixedly connected to the rear wall at right angles thereto.

3. The transport carriage according to claim 2 wherein said fixedly connected side wall and said rear wall are integrally formed.

4. The transport carriage according to claim 1 wherein said bearing pin is located centrally of said supporting means.

5. The transport carriage according to claim 1 wherein said supporting means comprises a housing for said running wheel.

6. The transport carriage according to claim 1 wherein said supporting means comprises a rectilinear plate substantially corresponding to the length of said rear wall.

7. The transport carriage according to claim 6, wherein said supporting means is provided with a pair of spaced running wheels.

8. The transport carriage according to claim 1 including a wall portion fixedly connected to said frame at right angles thereto, along the edge thereof adjacent said pivotal side wall, said pivoted side wall being hingedly connected to the wall portion.

9. The transport carriage according to claim 1 including a lever having one end pivotally attached to said pivotal side wall and the other end pivotally attached to said supporting means for limiting the outward movement of said movable side wall.

10. The transport carriage according to claim 1 including abutment means provided on said supporting means for limiting the swinging movement of said rear wall about said bearing pin.

11. The transport carriage according to claim 1 including at least one shelf foldably journalled on at least one of said rear wall or said side walls.

12. The transport carriage according to claim 10 wherein said shelves are detachably journalled with said side walls of said rear wall.

13. The transport carriage according to claim 1 including at least one shelf stationarily secured and extending from said rear wall.

14. The transport carriage according to claim 1 including locking means for securing said side walls, frame and supporting means in each of said transport or nesting condition.

* * * * *